United States Patent
Breternitz, Jr.

(10) Patent No.: US 6,523,095 B1
(45) Date of Patent: Feb. 18, 2003

(54) METHOD AND DATA PROCESSING SYSTEM FOR USING QUICK DECODE INSTRUCTIONS

(75) Inventor: Mauricio Breternitz, Jr., Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/684,717

(22) Filed: Jul. 22, 1996

(51) Int. Cl.[7] ............................................. G06F 12/00
(52) U.S. Cl. ......................... 711/144; 711/118; 711/125
(58) Field of Search ..................... 364/DIG. 1, DIG. 2, 364/243.4, 243.41, 243.42; 711/3, 118, 125, 133, 134, 144, 154

(56) References Cited

U.S. PATENT DOCUMENTS

| | | | | |
|---|---|---|---|---|
| 4,910,656 A | * | 3/1990 | Scale, III et al. | 711/144 |
| 5,155,824 A | * | 10/1992 | Edenfield et al. | 711/144 |
| 5,241,664 A | * | 8/1993 | Ohba et al. | 711/144 |
| 5,367,660 A | * | 11/1994 | Gat et al. | 711/144 |
| 5,426,765 A | * | 6/1995 | Stevens et al. | 711/144 |
| 5,428,761 A | * | 6/1995 | Herlihy et al. | 711/144 |
| 5,555,392 A | * | 9/1996 | Chaput et al. | 711/144 |
| 5,555,394 A | * | 9/1996 | Arakawa et al. | 711/144 |
| 5,572,700 A | * | 11/1996 | Hays et al. | 711/144 |
| 5,579,504 A | * | 11/1996 | Callander et al. | 711/144 |

OTHER PUBLICATIONS

James Gosling, "Oak1 Intermediate Bytecodes", ACM SIGPLAN Workshop on Intermediate Representations (IR '95), pp. 111–118.

* cited by examiner

Primary Examiner—Tuan V. Thai

(57) ABSTRACT

A cache line of a cache (230) contains a modifiable instruction. The modifiable instruction is decoded by a central processor unit (210) (CPU) which performs the function associated with the modifiable instruction. After the modifiable instruction has been executed, the CPU (210) sets an instruction modified bit associated with the cache (200) based on the execution results of the modifiable instruction. During a subsequent process of the modifiable instruction location, the CPU Decode Unit (212) substitutes a modified instruction for the modifiable instruction based on the instruction modify indicator.

24 Claims, 2 Drawing Sheets

METHOD AND DATA PROCESSING SYSTEM FOR USING QUICK DECODE INSTRUCTIONS

FIELD OF THE INVENTION

Generally, the present invention relates to instruction decode and execution, and specifically to conditional decoding of instructions.

BACKGROUND OF THE INVENTION

The JAVA byte code interpreter has a number of instructions having normal and quick versions. The first time a normal opcode of one of these instructions is encountered, it triggers a number of checks. Each of these checks takes a certain amount of overhead, generally in the form of time. The quick counter part of a normal instruction executes the instructions function without all of the associated overhead.

When a JAVA code interpreter executes an instruction opcode that has a quick version, it overwrites the memory location containing the instruction with the alternative quick version as shown in prior art FIG. 1. As a result, subsequent fetches from the memory location execute the quick version, and hence do not repeat the checks required by the normal version of the opcode.

One problem associated with such overriding of existing code is the additional overhead of having to write back modified instructions to memory. When a cache is used, not only does the instruction in the cache get modified, but at some point, when the cache line is flushed, the entire cache line may have to be written back to memory. Depending on the cache configuration, it may be necessary to update the external memory in order to match the cache whenever a change in the cache occurs, known as write through mode. By requiring modified code to be moved back to memory causes an increased usage of memory bandwidth, hence slowing down overall system operation. In addition the need to write over an existing opcode also requires additional steps which can reduce system performance. Therefore, it would be beneficial to eliminate the need to perform the overwrite of a normal opcode with a quick opcode.

DETAILED DESCRIPTION OF THE DRAWINGS

Generally, in a preferred embodiment of the present invention, a cache line contains a modifiable instruction. The modifiable instruction is decoded by a central processor unit (CPU) which performs the function associated with the modifiable instruction. After the modifiable instruction has been executed, the CPU sets an instruction modified bit based on the execution results of the modifiable instruction. During a subsequent process of the modifiable instruction location, the CPU Decode Unit (212) will automatically substitute a modified instruction for the modifiable instruction based on the fact the instruction modify indicator has been set. By using an instruction modify indicator, it is no longer necessary to overwrite modifiable instructions with the alternative embodiment, thereby saving time and bandwidth for the system.

Figure 2:
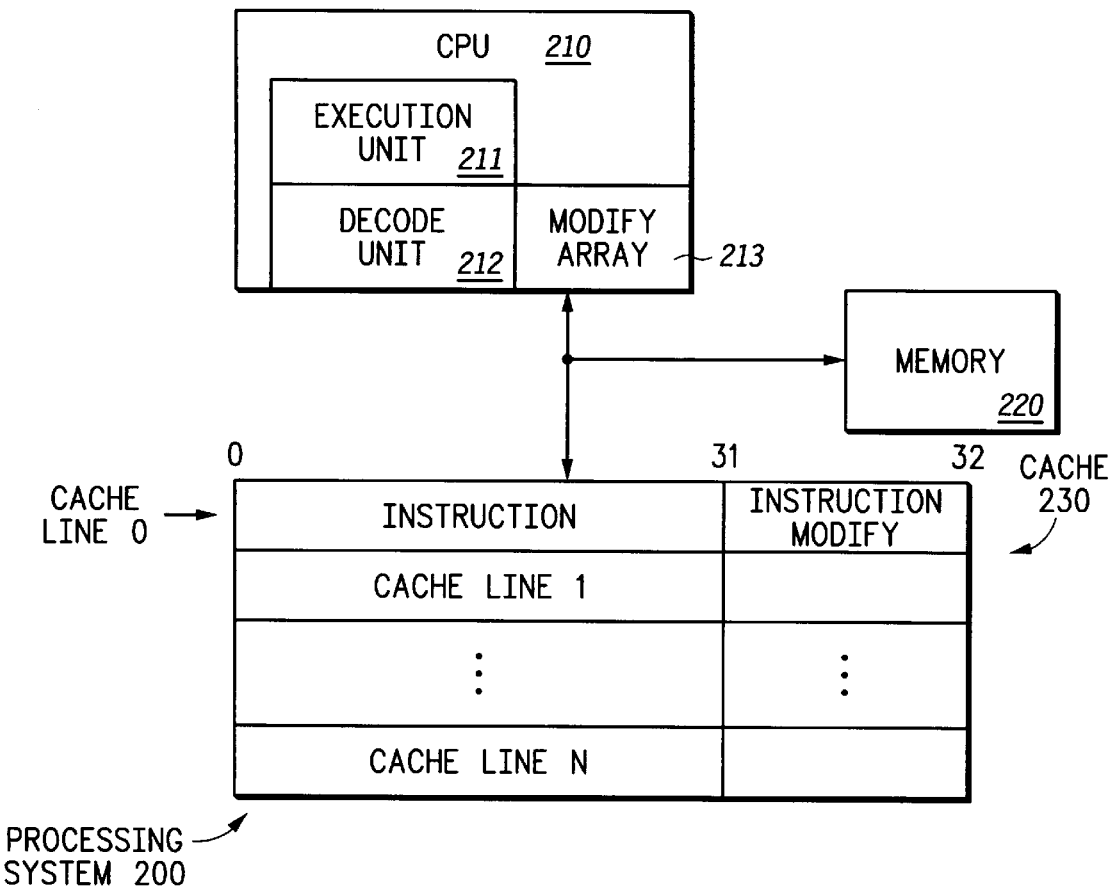
FIG. 2 illustrates, in block diagram form, a processor system 200 in accordance with the present invention.

FIG. 2 illustrates, block diagram form, a CPU 210 coupled to a memory 220, and a cache 230. The cache 230 comprises cache line 0 through cache line N. Each cache line has an instruction modify indicator associated with it. In FIG. 2, this is illustrated as a one bit extension of the cache line.

Figure 1:
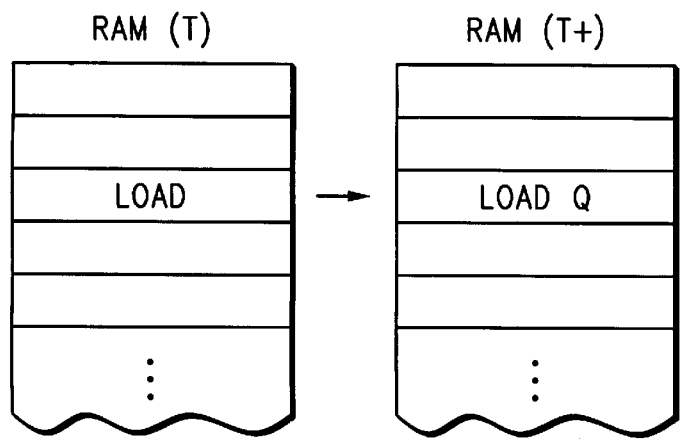
FIG. 1 illustrates, in block form, a RAM location as modified by the prior art.

Adaptive opcodes are used to achieve efficient execution of programs while preserving a compact program size. Generally, adaptive opcodes are used where the functional implementation of the instruction associated with opcode is dependent upon system or state information at the time of execution. JAVA is one example of language which uses adaptive opcodes. For example, JAVA has a load (LOAD) instruction and a load quick (LOADQ) instruction. The instruction LOAD may be adaptively modified during program execution to become a LOADQ instruction. To illustrate, JAVA's LOAD requires the offset to the source of the data to be accessed to be calculated at execution time. Once calculated, the source, and hence the offset, will generally not change and therefore there is a LOADQ instruction which maintains necessary source information for quick execution on subsequent accesses. In prior art systems, this is accomplished by overwriting the LOAD instruction with the LOADQ instruction, as illustrated in FIG. 1.

In one embodiment of the present invention, the code modification is accomplished by maintaining ah instruction modified indicator. Referring to FIG. 2, the memory 220 would receive a plurality of opcodes from a source not shown. The plurality of opcodes would contain adaptive opcodes. During a first access to a memory location in memory 220 containing an adaptive opcode, the processing system 200 would receive a cache miss from cache 230, indicating the instruction to be executed does not reside in the cache. Upon receipt of the cache miss, the processing system 200 would fetch the instruction to be executed from memory 220 and fill one of the cache lines in cache 230. When a cache line in cache 230 is filled, the instruction modify indicator bit would be cleared.

By clearing the instruction modify indicator, the CPU 210 via the decode unit 212 would know that the instruction being fetched which is associated with that indicator has not been modified. As such, the CPU 210 via the execution unit 211 will execute the normal instruction or LOAD. Execution of the normal instruction by the CPU 210 causes the instruction modify indicator bit to be set, indicating that on a subsequent call to this instruction location, that an adopted opcode should be called. For example, with JAVA, the LOAD instruction could be replaced with the LOADQ instruction if the instruction modify bit were set.

When a cache line is flushed, indicating that it is being replaced with other data, the instruction modify indicator need not be stored in the memory 220. This would prevent the overhead of having to perform a write back, or write through operation. Generally speaking, least recently used cache lines are flushed which would indicate the flushed line is not used very often. As such, there would be no need to perform a writeback operation, as not a significant amount of time will be saved.

Note that the instruction modify indicator (or bit), need not necessarily be part of the cache line. It is only important that each cache line has an instruction modify bit associated with it. Also note, that the instruction modify indicator may be more than one bit, in the event there is more than one possible alternative to the adoptive opcode being executed.

In another embodiment, the CPU 210 contains a modify array separate from the instruction modify indicator portion of each cache line. When instruction flow passes to a given cache line, the modify array of the CPU 210 would be initialized to indicate the state of the instruction modify indicators associated with each instructions such that there will be an instruction modify indicator for each instruction within in a given cache line. As such, as long as execution continues from a current cache line, only the modify array of CPU 210 would be updated to indicate the current status of each instruction modify bit. Only after control flows out of the current cache line, either through a fall through to the next cache line, or by a flow indirection instruction, would the information in the array of CPU 210 be transferred to the appropriate cache line.

This is advantageous in that it prevents using bandwidth on the bus between the CPU 210 and the cache 230 when ever a given instruction is modified. By maintaining the current cache line's instruction modify indicators in the modified array of the CPU 210, it is only necessary to perform a single update to the cache 230 from the CPU per cache line.

Figure 3:
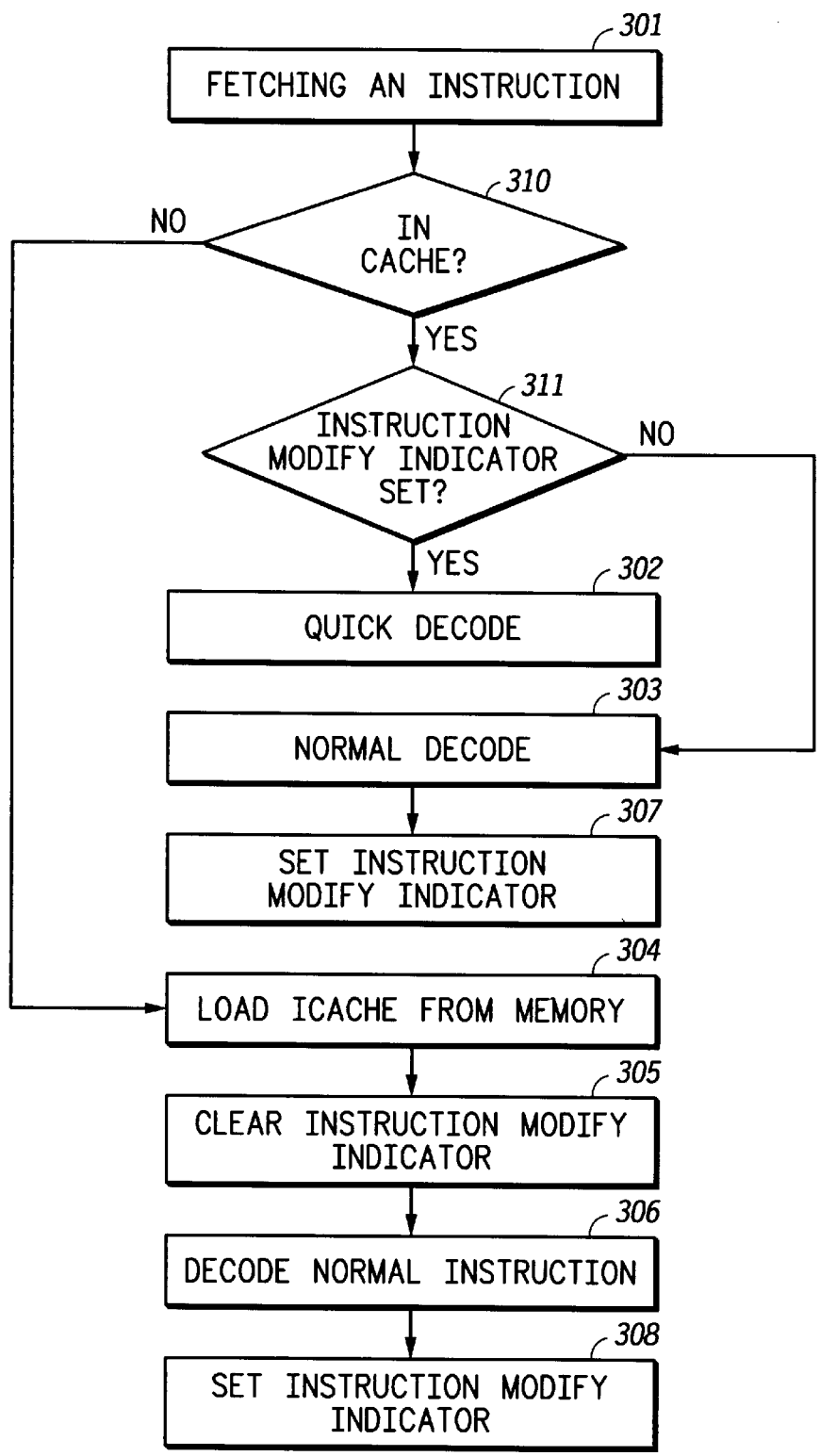
FIG. 3 illustrates, in flow diagram form, a method 300 in accordance with the present invention.

FIG. 3 illustrates a method 300 in accordance with the present invention. Method 300 contains rectangular execution blocks 301–308, and diamond shaped decision blocks 310 and 311. At step 301, an instruction fetch is initiated for an instruction to be executed. Next, at step 310, a determination is made whether or not the fetched instruction currently resides in cache. If the instruction does reside in cache, flow proceeds to step 311, conversely if it does not currently reside in cache, flow proceeds to step 304. At step 311, a determination is made whether or not the instruction modified bit associated with the instruction is set. If the corresponding instruction modify bit is set, flow proceeds to step 302 where a quick decode takes place. Note that while in this embodiment only a single bit is used to determine between a normal instruction and a quick instruction, it is understood that step 311 could determine whether one of a number of modified instruction is to be used. In addition, the instruction modify bit may actually be incorporated as one of the bits of the actual instruction word.

If determined that the indicator bit has not been set at step 311, flow proceeds to step 303. At step 303 a decode of the normal instruction commences. Next, at step 307, the instruction modify indicator bit is set upon completion of the decode at step 303. If it is determined at step 310 that the instruction being fetched is not in cache, flow proceeds at step 304. At step 304 the instruction fetch from memory is completed and is loaded into cache from memory. Next, at step 305, the instruction modify indicator is cleared. Note in an alternative embodiment the instruction modifier could also be received from memory in which case it would be loaded indicating whether or not the current instruction is available for an alternative decode. Next, at step 306, decode of the normal instruction occurs. Next, at step 308, the instruction modify indicator bit is set.

While one embodiment of the present invention has been put forth, it is understood that there are any number of modifications which can be made to the embodiment put forth. For example, it would be possible to modify the cache line flush mechanism such that modified cache lines would be written back to memory in order to reflect the use of a quick instruction over an original instruction. Furthermore, as briefly discussed, the above description assumes just one extra bit of information is added to the cache line. It is possible to keep more information, including program execution state or previous opcodes, to create adoptive opcodes whose execution is controlled by other elements of state. A possible example would be loops that have a "touch load" operation. A touch load operation, is one where a cache line is created in an initial state, eliminating the need for loading the cache line from memory. In this instance it may be desirable to replace a touch load on a first pass through a loop with a real load on subsequent executions through the loop. Another alternative would be to have instructions that would switch between having a normal function, and a no-opt function. This would allow instructions to be switched in and out at the cache line level according to a single bit which would substitute a no-opt.

Another alternative would be where a first time a Java language bytecode is executed a security procedure is invoked.

I claim:

1. A method of executing a data processor instruction comprising:

loading a representation of a first data processor instruction into a first memory location;

setting a second memory location to one of a first state and a second state;

processing the representation of the first data processor instruction in the first memory location and executing the first data processor instruction if the second memory location is determined to be in the first state; and processing the representation of the first data processor instruction in the first memory location and executing a second data processor instruction if the second memory location is determined to be in the second state.

2. The method of claim 1, wherein the second memory location is independent of the first memory location.

3. The method of claim 1, wherein the second memory location is in the first state prior to the first data processor instruction being executed the first time.

4. The method of claim 3, wherein the second memory location is in the second state after the first data processor instruction has been executed the first time.

5. The method of claim 1, wherein the instruction is executed during an instruction execution cycle having a beginning and an end.

6. The method of claim 1, wherein the first and second memory location are in cache.

7. The method of claim 1 wherein the processing further includes:

substituting by a decode unit, the second data processor instruction for the first data processor instruction if the second memory location is determined to be in the second state.

8. The method of claim 1 wherein the processing further includes:

providing by a decode unit the second data processor instruction to an execution unit if the second memory location is determined to be in the second state.

9. The method of claim 1 wherein the first data processor instruction includes a LOAD instruction and the second data processor instruction includes a LOADQ instruction.

10. The method of claim 1 wherein the second data processor instruction is a modified instruction of the first data processor instruction.

11. A method of executing a data processor instruction comprising:

loading a representation of a data processor instruction into a first memory location;

setting a second memory location to one of a first state and a second state wherein the second memory location is independent of the first memory location;

processing the representation of the data processor instruction in the first memory location and executing the data processor instruction to perform a first function and a second function if the second memory location is determined to be in the first state; and processing the representation of the data processor instruction in the first memory location and executing a second data processor instruction to perform the second function and not the first function if the second memory location is determined to be in the second state.

12. The method of claim 11, wherein the second memory location is in the first state prior to the instruction being executed the first time.

13. The method of claim 11, wherein the second memory location is in the second state after the data processor instruction has been executed the first time.

14. The method of claim 11, wherein the instruction is executed during an instruction execution cycle having a beginning and an end in time.

15. The method of claim 11, wherein the first and second memory location are in cache.

16. The method of claim 11, wherein the second memory location is independent of the first memory location.

17. The method of claim 11 wherein the second data processor instruction is a modified instruction of the data processor instruction.

18. The method of claim 11 further comprising:

wherein the second function includes accessing data;

wherein the first function includes calculating an offset of a source of the data.

19. A data processing system, comprising:

a cache line containing a plurality of instruction locations including a first instruction location;

a memory location capable of being associated exclusively to the first instruction location;

a decode unit coupled to the first instruction location and the memory location, wherein the decode unit is for decoding a first instruction stored in the first instruction location when the memory location contains a first value, and for decoding a second instruction when the memory location contains a second value and the first instruction location contains the first instruction, the second instruction being a modified version of the first instruction.

20. The data processing system of claim 19, wherein the first instruction is a load instruction, and the second instruction is a quick load instruction.

21. The data processing system of claim 19, wherein the memory location is exclusively associated to the first instruction location.

22. The data processing system of claim 19, wherein the instruction and the modified instruction have at least one function in common.

23. The data processing system of claim 19, wherein the first instruction and the second instruction have at least one function in common.

24. The data processing system of claim 19, wherein decoding the second instruction requires less time than decoding the first instruction.

* * * * *

UNITED STATES PATENT AND TRADEMARK OFFICE
CERTIFICATE OF CORRECTION

PATENT NO. : 6,523,095 B1  Page 1 of 1
DATED : February 18, 2003
INVENTOR(S) : Mauricio Breternitz, Jr.

It is certified that error appears in the above-identified patent and that said Letters Patent is hereby corrected as shown below:

Column 5,
Line 18, please replace with the following:
14. The method of claim 11, wherein the data processor instruction is executed during an instruction execution cycle having a beginning and an end in time.

Column 6,
Line 1, please replace with the following:
19. A data processing system, comprising:
   a cache line containing a plurality of instruction locations including a first instruction location;
   a memory location capable of being associated exclusively to the first instruction location;
   an execution unit;
   a decode unit coupled to the first instruction location, the execution unit, and the memory location, wherein if the memory location is determined to contain a first value, the decode unit provides an instruction stored in the first instruction location to the execution unit for execution, wherein if the memory location is determined to contain a second value, the decode unit utilizes the instruction stored in the first instruction location to provide a modified instruction of the instruction to the execution unit for execution.
Line 16, please replace with the following:
20. The data processing system of claim 19, wherein the instruction is a load instruction, and the modified instruction is a quick load instruction.
Line 28, please replace with the following:
24. The data processing system of claim 19, wherein executing the second instruction requires less time than executing the instruction.

Signed and Sealed this

Twenty-fifth Day of November, 2003

JAMES E. ROGAN
*Director of the United States Patent and Trademark Office*